US00RE34527E

United States Patent [19]

Yoshida et al.

[11] E Patent Number: Re. 34,527

[45] Reissued Date of Patent: Feb. 1, 1994

[54] FEEDER WIRE STRUCTURE FOR HIGH PRESSURE FUEL INJECTION UNIT

[75] Inventors: Takeo Yoshida; Minoru Suzuki, both of Iwata, Japan

[73] Assignee: Yamaha Hatsudoki Kabushiki Kaisha, Iwata, Japan

[21] Appl. No.: 885,344

[22] Filed: May 19, 1992

Related U.S. Patent Documents

Reissue of:

[64] Patent No.: 5,088,647
Issued: Feb. 18, 1992
Appl. No.: 610,539
Filed: Nov. 8, 1990

[30] Foreign Application Priority Data

Nov. 9, 1989 [JP] Japan ..... 1-293362

[51] Int. Cl.[5] ..... F02M 47/00

[52] U.S. Cl. ..... 239/96; 239/533.8; 239/585.1

[58] Field of Search ..... 239/585.1-585.5, 239/533.2-533.12, 88-92, 96

[56] References Cited

U.S. PATENT DOCUMENTS

| | | | |
|---|---|---|---|
| 1,822,668 | 9/1931 | Protzeller . | |
| 2,637,407 | 5/1953 | Burk et al. . | |
| 2,769,943 | 11/1956 | Matthews . | |
| 3,079,947 | 3/1963 | Hunt et al. . | |
| 3,913,537 | 10/1975 | Ziesche et al. | 239/96 |
| 3,942,485 | 3/1976 | Suda et al. . | |
| 4,007,880 | 2/1977 | Hans et al. . | |
| 4,342,443 | 8/1982 | Wakeman | 239/585.5 |
| 4,482,093 | 11/1984 | Hafner et al. | 239/533.3 |
| 4,637,553 | 1/1987 | Kushida et al. | 239/533.4 |
| 4,795,098 | 1/1989 | Kirchner et al. | 239/585.1 |
| 4,899,935 | 2/1990 | Yoshida et al. | 239/533.8 |
| 4,972,996 | 11/1990 | Cerny | 239/585.4 |
| 4,993,636 | 2/1991 | Taue et al. | 239/585.3 |
| 5,004,154 | 4/1991 | Yoshida et al. | 239/533.4 |

FOREIGN PATENT DOCUMENTS 64-36971 2/1989 Japan .

*Primary Examiner*—Karen B. Merritt
*Attorney, Agent, or Firm*—Ernest A. Beutler

[57] ABSTRACT

An accumulator type of fuel injection nozzle having an injection valve that is controlled by an electromagnet within the accumulator chamber includes a feeder wire structure formed axially in the outer housing assembly of the injection nozzle for energizing the electromagnet. This feeder wire structure includes one or more axially extending wire passages formed in the outer housing assembly, preferably in a structure through which is formed a fuel inlet conduit, constructed so as to withstand the high pressure within the accumulator chamber, to provide a sufficient seal without increasing the outer diameter of the injection nozzle, and to provide easy installation of the injection nozzle without interference from the engine. One or more feeder wires are contained within the wire passages for energizing the electromagnet.

8 Claims, 4 Drawing Sheets

(a)

(b)

(a)

(b)

FEEDER WIRE STRUCTURE FOR HIGH PRESSURE FUEL INJECTION UNIT

Matter enclosed in heavy brackets [ ] appears in the original patent but forms no part of this reissue specification; matter printed in italics indicates the additions made by reissue.

BACKGROUND OF THE INVENTION

This invention relates to a high pressure fuel injection unit for an engine, and more particularly to an improved feeder wire structure for energizing an electromagnetic assembly of the injection unit.

One popular form of fuel injection unit for engines is the so-called "accumulator type." This type of injection nozzle includes an accumulator chamber that is charged with fuel under pressure and which communicates with a nozzle port. An injection valve is supported within the accumulator chamber and controls the discharge through the nozzle port. An actuating device is associated with the injection valve and is movable within a control chamber that is also pressurized with fuel. A valve is associated with the control chamber and is opened so as to reduce the pressure and cause the pressure in the accumulator chamber to unseat the injection valve and initiate fuel injection. Typically, the valve is operated by a main electromagnetic assembly that is contained within the housing of the fuel injection nozzle.

To control the amount of fuel injected, the inventors have proposed to provide an additional and separate sub-electromagnetic assembly within the accumulator chamber to control the lift movement of the injection valve. It has also been proposed to provide a wire passage which extends radially through the side wall of the accumulator chamber in which a wire harness is supported for operating this sub-electromagnetic assembly. Although this type of feeder wire structure is generally satisfactory, the angular orientation of the wire passage in relation to the housing can give rise to sealing, size and installation problems. For example, when the wire passage extends perpendicularly or at an angle to the housing axis, the side wall of the accumulator chamber is usually not thick enough to provide a sufficient seal around the wiring passage so as to withstand the high pressure within the accumulator chamber. This typically has required that the diameter of the fuel injection unit be enlarged to improve the effectiveness of the seal. In addition, when the wire passage is disposed at an angular relationship to housing axis, the wires may interfere with the engine or other components which can make installation of the injection unit in the engine difficult.

It is, therefore, a principal object of this invention to provide an improved feeder wire structure for an electromagnetic assembly within the accumulator chamber of this type of fuel injection unit.

It is a further object of this invention to provide an improved feeder wire and sealing structure for this type of fuel injection unit which is capable of withstanding the high pressure in the accumulator chamber.

It is yet another object of this invention to provide an improved feeder wire and sealing structure for an accumulator type fuel injection unit which provides a sufficient seal without the need for increasing the outer diameter of the injection unit.

It is still another object of this invention to provide an improved feeder wire structure which does not present a problem with respect to installation of the injection unit in the engine.

SUMMARY OF THE INVENTION

This invention is adapted to be embodied in an accumulator type of injection nozzle that is comprised of an outer housing assembly defining a cavity partitioned into an accumulator chamber which is adapted to be supplied with high pressure fuel and a coil chamber. A nozzle port leads from the accumulator chamber and an injection valve is moveable between a closed position and an open position for controlling the discharge of fuel from the accumulator chamber through the nozzle port. A control chamber is also incorporated that receives pressurized fuel. An actuating member is supported for movement within this control chamber and is associated with the injection valve for retaining the injection valve in its closed position when the control chamber is pressurized and for movement of the injection valve to its open position when pressure is relieved in the control chamber. A valve means is moveable between a closed position for maintaining pressure in the control chamber and an open position for relieving pressure in the control chamber for effecting fuel discharge through the nozzle port.

In accordance with the invention, a first electromagnet is positioned within the accumulator chamber for controlling the injection valve. At least one wire passage is formed in the outer housing assembly and extends axially and has at least one feeder wire extending axially therethrough for energizing the first electromagnet.

In accordance with one embodiment of the invention, a second electromagnet is provided within the coil chamber for moving the valve means to one of the positions when this second electromagnet is energized, and the first electromagnet controls the lift of the injection valve so as to vary the amount of fuel which is discharged from the nozzle port.

DETAILED DESCRIPTION OF THE PREFERRED EMBODIMENT OF THE INVENTION

Figure 1:
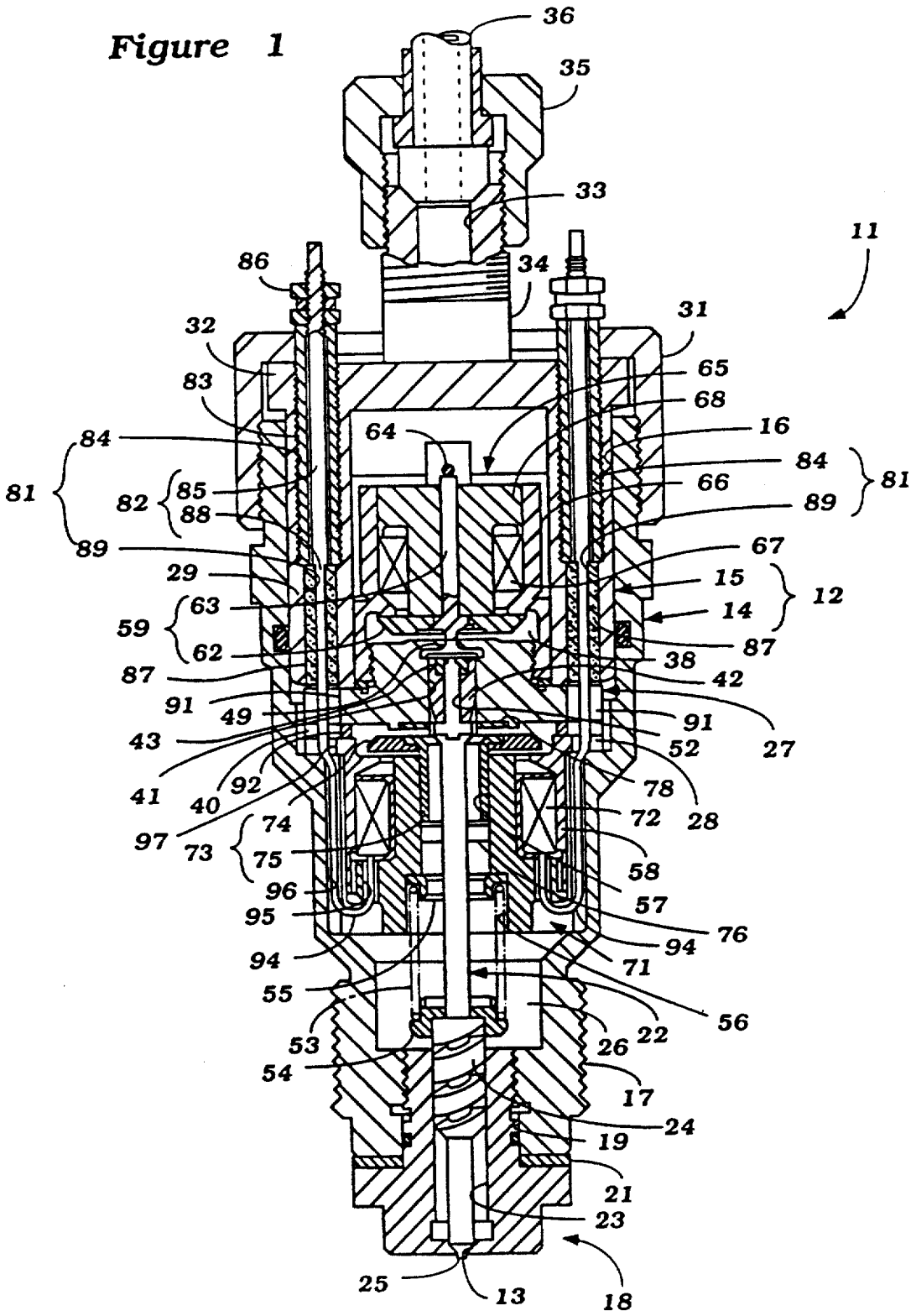
FIG. 1 is a cross-sectional front view of a fuel injection nozzle constructed in accordance with an embodiment of the invention.
Figure 2:
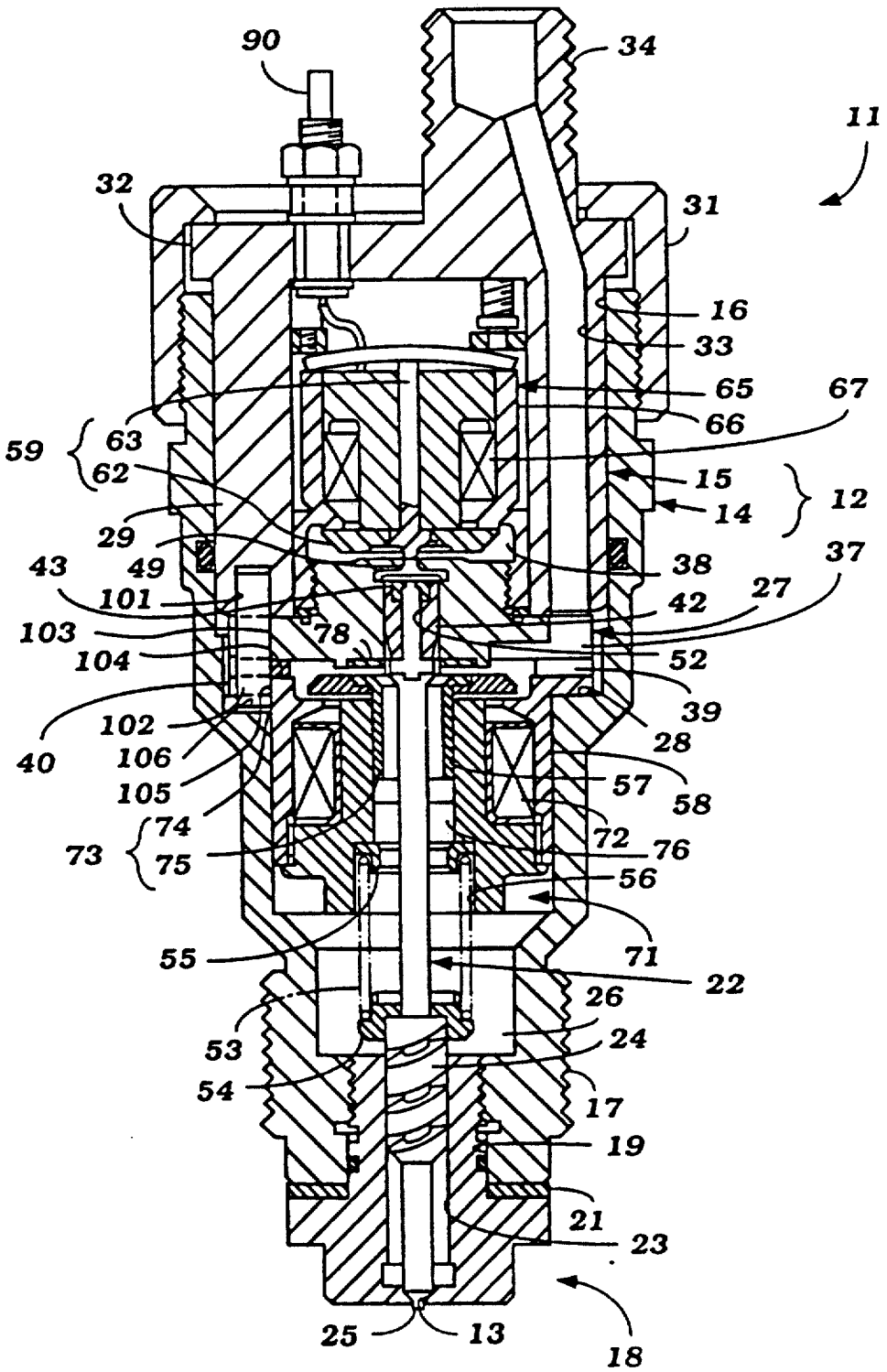
FIG. 2 is a cross-sectional side view of the fuel injection nozzle.

Referring to the drawings, and in particular to FIGS. 1 and 2, a fuel injection nozzle constructed in accordance with an embodiment of the invention is identified generally by the reference numeral 11. The injection nozzle 11 is comprised of an outer housing assembly, indicated generally by the reference numeral 12, that is adapted to be mounted, in a manner to be described, in the cylinder head of an internal combustion engine with a nozzle port 13 communicating with the combustion chamber for delivering fuel to it in a manner to be described. The invention may be used for direct cylinder injection, or instead may be utilized in conjunction with manifold injection systems. The invention, however, has particular utility with direct fuel injection, for example, as used with high speed diesel engines.

Fuel is supplied to the injection nozzle 11 from a remotely positioned fuel tank (not shown) by means of a high pressure pump (not shown). Excess fuel is returned back to the fuel tank or reservoir through a return line.

The outer housing assembly 12 is comprised of a casing body 14 and a cover member 15 which is removably seated within an opening 16 at the top of the casing body 14. The casing body 14 has a threaded lower end 17 which is adapted to be threaded into a suitable aperture in the cylinder head of the associated engine (not shown) in a known manner. The nozzle port 13 is defined by a tip 18 that has a threaded portion which is received in a threaded bore 19 formed at the lower end of the casing body 14. An adjusting shim 21 is interposed between the nozzle piece 18 and the lower end of the casing body 14 for length adjustment of the fuel injection nozzle 11.

An injection valve 22 is slidably supported within a bore 23 of the nozzle piece 18 and has a guide portion 24 formed with a helical groove at its lower portion, and a flow controlling tip 25 which, when in the closed position, closes the injection nozzle port 13.

An accumulator chamber 26 is formed at the upper end of and above the bore 23 in the lower portion of the casing piece 14. The accumulator chamber 26 is closed at its upper end by means of a partitioning plate 27 that is held against a shoulder 28 in the casing body 14 by a bottomed cylindrical pipe portion 29 of the cover member 15. A cap 31 having a threaded bore engages a threaded portion of the upper portion of the casing body 14 and presses against a top plate 32 of the cover member 15 to hold it in position.

The cover member 15 is formed with an inlet conduit 33 that has a threaded external portion 34 so as to receive a fitting 35 for connecting a supply line 36 extending from the pressure pump to the inlet conduit 33. The inlet conduit 33, which is generally a drilled opening, extends axially along the cover member 15 at its periphery at one side thereof and communicates at its lower end with the accumulator chamber 26 through a corresponding fuel groove 37 formed in the partitioning plate 27 and groove 39 in spacer 40 for delivering fuel to the accumulator chamber 26.

Figure 3:
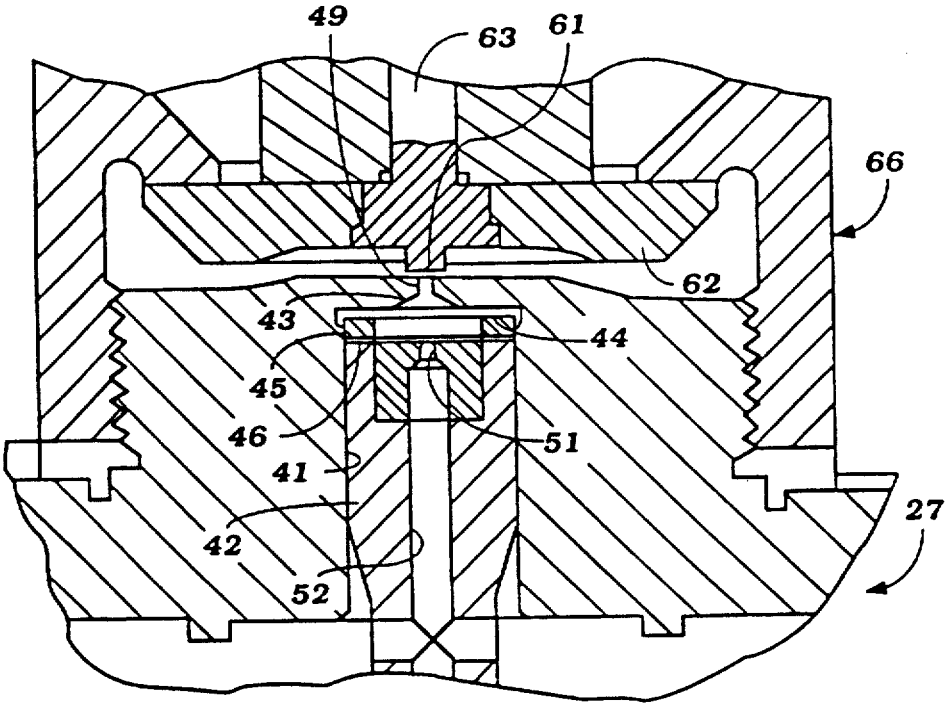
FIG. 3 is an enlarged cross-sectional view of the control chamber portion of the fuel injection nozzle.
Figure 6:
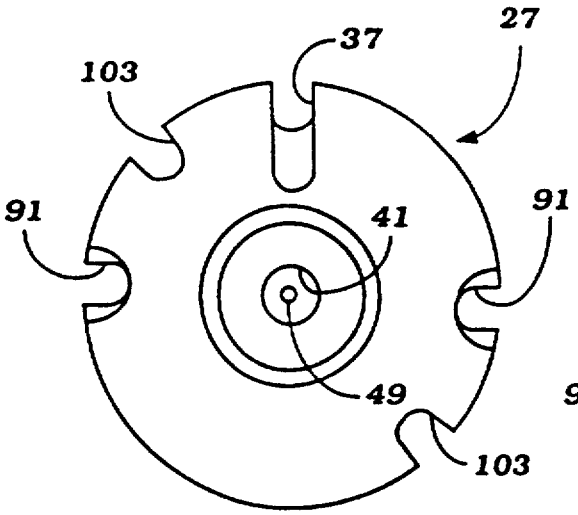
FIG. 6(a) is a top plan view of the partitioning plate of the fuel injection nozzle.
FIG. 6(b) is a bottom view of the partitioning plate.
Figure 6:
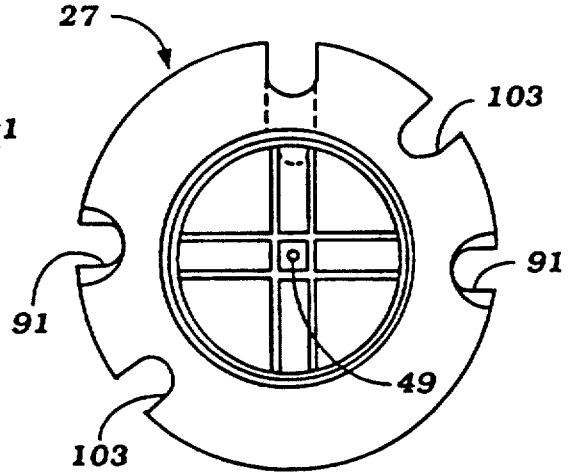

The partitioning plate 27 is generally disc-shaped, as shown in FIG. 6(a) and (b), and serves to separate the accumulator chamber 26 from a coil chamber 38 in the upper portion of the casing body 14. The partitioning plate 27 has a centrally positioned aperture 41 into which an actuator portion 42 of the injector valve 22 is slidably supported and which closes a control chamber 43 formed within the partitioning plate 27 in a space defined by the upper portion of this aperture 41 and an inner face 44 of the partitioning plate 27, as shown in FIG. 3. A shim plate 45 is positioned between a top face 46 of the actuator portion 42 and the partitioning plate face 44 as shown in FIG. 3 for adjusting the lift of the injection valve 22.

Figure 4:
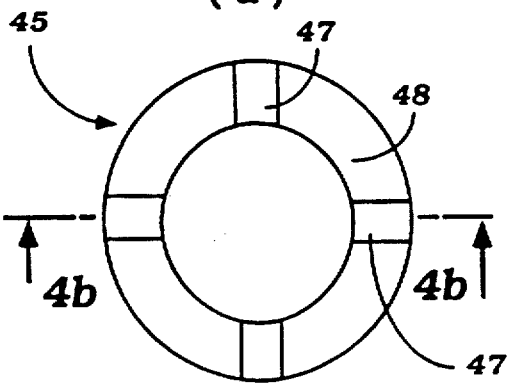
FIG. 4(a) is a bottom view of the shim plate of the fuel injection nozzle.
FIG. 4(b) is a cross-sectional view taken along line IV(b)–IV(b) of FIG. 4(a).
Figure 4:
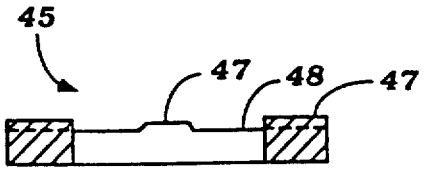
Figure 5:
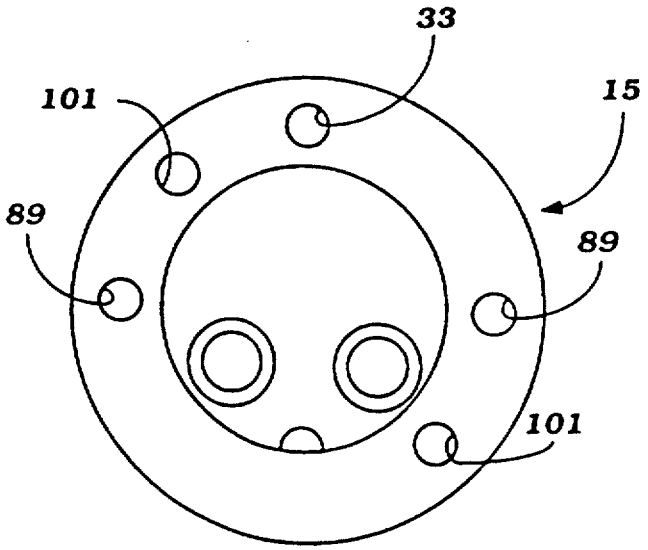
FIG. 5 is a bottom view of the cover member of the fuel injection nozzle.

The shim plate 45 is an annular plate, as shown in FIGS. 4(a) and 4(b), and has raised portions 47 projected every 90 degrees which abut against the partitioning plate face 44. Grooved portions 48 are interposed in between for receiving pressurized fluid. This shim plate 45 may be installed upside down.

A restricted orifice 49 communicates the control chamber 43 with the coil member 38. As shown in FIG. 3, a throttle hole 51 fixed in the end of the actuator portion 42 and an axial passage 52 formed through the upper portion of the injection valve 22 communicate the control chamber 43 with the accumulator chamber 26. The control chamber 43 communicates with the throttle hole 51 to receive the pressurized fluid and normally urge the injection valve 22 toward its downward or closed position.

A coil compression spring 53 encircles the injection valve 22, and at its lower end engages a cup-shaped retainer 54 that is held axially in position against the helical groove of the guide portion 24. The upper end of the spring 53 bears against an upper spring seat 55 which is positioned against a shoulder formed by an enlarged portion 56 at the lower end of a bore 57 formed in a holder member 58. The coil compression spring 53 acts to further assist in maintaining the injection valve 22 in the closed position, as shown in FIGS. 1 and 2.

A valve 59 is supported at the upper end of the partitioning plate 27 and controls the opening of the restricted orifice 49. The valve 59 comprises a headed portion 61 that is received within a corresponding recess formed in an enlarged disc-like armature plate 62, and a stem portion 63 which is in engagement with a spring 64 so as to bias the valve 69 toward its closed position to maintain the orifice 49 in its closed position.

The valve 59 is opened and closed so as to control the discharge of fuel from the nozzle port 13 by means of an electromagnetic assembly, indicated generally by the reference numeral 65. This electromagnetic assembly 65 includes a generally cylindrical yoke 66 that has a threaded opening at an enlarged diameter lower end portion which is received on a threaded portion of the partitioning plate 27 so as to secure the electromagnetic assembly 65 in position. The electromagnetic assembly 65 is further comprised of a solenoid coil or winding 67 that is disposed within the housing or yoke 66 and which encircles an armature 68. The armature 68 is formed with a bore that slidably supports the valve stem 63 of the valve 59.

A circuit (not shown) is used for energizing the coil 67 of the electromagnetic assembly 65 for opening and closing the valve 59.

The condition shown in FIGS. 1 and 2 is that which occurs when the winding 67 is de-energized. When the winding 67 is de-energized, the valve 59 will be held in its closed position by the spring 64 so that the accumulator chamber 26 and control chamber 43 may be pressurized.

At the appropriate instant for fuel injection to begin, which may be controlled by any suitable strategy, the winding 67 is energized. When this happens, the valve armature 62 will be attracted upwardly by the flux in the armature 68 so as to urge the stem portion 63 upwardly and open the valve 59 against the action of the spring 64. This will open the orifice 49 to rapidly deplete the pressure in the control chamber 43. The higher pressure of the fuel acting in the accumulator chamber 26 will then urge the injection valve 22 upwardly to its open position and permit fuel to issue from the nozzle port 13. When the fuel pressure in the accumulator 26 has been depleted, the spring 64 will move the injection valve 22 to its closed position and the fuel pressure can then build up in the accumulator chamber 26. This action is initiated by discontinuing the energization of the winding 67 so as to close the valve 59 and permit pressure in the control chamber 43 to again build up.

The amount of fuel injected can be varied by varying the lift distance of the injection valve 22 by energizing or de-energizing a coil 72 of a sub-electromagnetic assembly, indicated generally by the reference numeral 71, and which is positioned within the accumulator chamber 26 for adjusting the lift and/or for detecting the lift of the injection valve 22. The coil 72 is supported within the holder member 58. A regulating member 73 comprised of an armature 74 fixed on the upper end of a cylindrical guide portion 75 which is slidably supported within the bore 57 of the holder member 58 regulates the lift amount of the injection valve 22. The lower end of the cylindrical guide portion 75 is positioned above a stopper portion 76 of the injection valve 22 to define a smaller lift distance of the injection valve 22. A stopper plate 78 made of non-magnetic material is positioned above the armature 74 and in contact with the lower end of the partitioning plate 27 so as to provide a stop surface for the regulating member 73 and to prevent transmission of stray magnetic flux paths through the partitioning plate 27.

If injection of a larger amount of fuel is desired, the coil 72 is maintained in a de-energized state so as to allow the regulating member 73 to move freely between the top surface of the holder member 58 and the stopper plate 78. In this condition, the injection valve 22 will be urged upward the distance defined by the space between the top face of the shim plate 45 and the partitioning plate face 44. On the other hand, if injection of a smaller amount of fuel is desired, the coil 72 is energized. When this occurs, the armature 74 is attracted downwardly by the flux in holder member 58 so as to lower the cylindrical guide portion 75. In this state, the injection valve 22 will be moved upward the distance defined by the space between the lower end face of the guide portion 75 and the upper face of the injection valve stopper portion 76 so as to permit a smaller amount of fuel to issue from the nozzle port 13.

With this type of arrangement, the amount of fuel delivered to the combustion chamber during each cycle of operation can be controlled as well as the injection pattern so as to provide optimum fuel delivery and control.

In accordance with the invention, a feeder wire structure is provided for energizing the coil 72 of the sub-electromagnetic assembly 71 so as to vary the lift distance of the injection valve 22 so that a larger or smaller amount of fuel can be injected, as desired. This structure includes a pair of bores 81 which extend axially through the cap 31 and cover member 15 in the periphery thereof to provide a wire passage for feeder wires to the coil 72. The feeder wires are defined by a pair of terminal feeder rods 82, preferably made of copper, which extend through the bores 81 with insulating sleeves 83 being interposed between holding portions 84 of the bores 81 and larger diameter portions 85 of the feeder rods 82. The larger diameter portions 85 of the feeder rods 82 are fixed to the inner surface of the insulating sleeves 83 with a high strength adhesive to withstand the high fuel pressure within the injection nozzle 11. A soft sealing adhesive 87 is interposed between a smaller diameter portion 88 of each feeder rod 82 and a sealing portion 89 of the bores 81. This sealing adhesive 87 is longitudinally compressed by the fuel pressure within the accumulator chamber 26 which acts on the lower end of the adhesive 87 causing it to radially expand so as to provide a strong seal around the smaller diameter portion 88 of each feeder rod 82 within the coil chamber 38. A nut 86 is affixed on the posts 90 of each rod 82 so as to afford attachment to an appropriate lead wire (not shown).

The lower ends of the smaller diameter portions 88 extend through circumferential grooves 91 in the partitioning plate 27 and are positioned in proximity to guide holes 92 in the spacer 40. A pair of wire harnesses 94 are connected to the coil 72 and extend downwardly through guide holes 95, and then upwardly through guide grooves 96 and 97, where the wires 94 are soldered to the lower ends of the smaller diameter portions 88.

With this type of feeder wire structure wherein the bores or wire passages 81 extend axially through the outer housing assembly 12, the wire passages 81 can be sealed along their entire length to insure a sufficient seal against the high pressure which forms within the fuel injection nozzle 11, without the need for increasing the outer diameter of the injection nozzle 11. The seal is particularly effective when the wire passages 81 is formed in the cover member 15 or like structure which is originally formed thicker to accommodate the inlet conduit 33. This construction also eliminates the need for increasing the outer diameter of the injection nozzle 11. It should be noted that, although the wire passages 81 are formed through the cover member 15 in the preferred embodiment, these wire passages 81 may instead be formed through another structure in which the inlet conduit 33 is formed, for example, through the casing body 14 when the inlet conduit 33 is formed therein.

This type of feeder wire structure also provides for easy installation of the injection nozzle 11 into the engine and permits the injection nozzle 11 to be oriented in any number of different positions within the engine without interference from the engine or other components.

Moreover, the cylindrical pipe portion 29 of the cover member 15 has a pair of knock pin holes 101 formed in the lower portion. Knock pins 102 are fitted into these pin holes 101 and extend downwardly through knock pin grooves 103, 104 and 105 formed through the periphery of the partitioning plate 27, the spacer 40 and the holder member 58 respectively, and are fitted into oppositely oriented knock pin holes 106 formed in the shoulder 28. These knock pins 102 serve to prevent these components from rotating relative to each other, and thus to prevent the feeder wire structure from becoming displaced.

Although the feeder wire structure has been described in connection with an electromagnetic assembly 71 for regulating the lift amount of the injection nozzle 22, it should be noted that this feeder wire structure is not so limited, and instead may also be used with other types of electromagnetic assemblies positioned in a chamber which is subjected to high pressures.

It is to be understood that the foregoing description is only that of a preferred embodiment of the invention, and that various changes and modifications may be made without departing from the spirit and scope of the invention, as defined by the appended claims.

We claim:

1. An accumulator type of injection nozzle comprising an outer housing assembly defining a cavity partitioned into an accumulator chamber adapted to be supplied with high pressure fuel and a coil chamber, a nozzle port leading from said accumulator chamber, an injection valve moveable between a closed position and an open position for controlling the discharge of fuel from said accumulator chamber through said nozzle port, a control chamber for receiving pressurized fuel, an actuating member supported for movement within said control chamber and associated with said injection valve for retaining said injection valve in its closed position when said control chamber is pressurized and for movement of said injection valve to its open position when pressure is relieved in said control chamber, valve means moveable between a closed position for maintaining pressure in said control chamber and an open position for relieving pressure in said control chamber for effecting fuel discharge through said nozzle port, a first electromagnet within said accumulator chamber for controlling the lift of said injection valve, and at least one wire passage formed in said outer housing assembly and extending axially, [and] at least one feeder wire extending axially through said wire passage for energizing said first electromagnet, *and seal means associated with said wire passage for sealing said wire passage so that it is able to withstand the pressure within said accumulator chamber.*

2. An accumulator type of injection nozzle as recited in claim 1, further comprising a second electromagnet within said coil chamber for moving said valve means to one of said positions when said second electromagnet is energized.

3. An accumulator type of injection nozzle as recited in claim 1, wherein an inlet conduit is formed in said outer housing assembly and extending axially for supplying fuel to said accumulator chamber.

4. An accumulator type of injection nozzle as recited in claim 3, wherein said wire passage and said inlet conduit are formed in the periphery of said outer housing assembly.

5. An accumulator type of injection nozzle as recited in claim 1, wherein said outer housing assembly comprises a cover member seated in said cavity, wherein said wire passage and an inlet conduit for supplying fuel to said accumulator chamber are formed in said cover member and extending axially.

6. An accumulator type of injection nozzle as recited in claim 5, wherein said wire passage and said inlet conduit are formed in the periphery of said cover member.

[7. An accumulator type of injection nozzle as recited in claim 1, further comprising seal means associated with said wire passage for sealing said wire passage so that it is able to withstand the pressure within said accumulator chamber.]

8. An accumulator type of injection nozzle as recited in claim 1, wherein said wire passage is formed in the periphery of said outer housing assembly.

9. An accumulator type of injection nozzle as recited in claim 1, further comprising a casing body and a cover member each having a plurality of holes formed in the periphery thereof, a partitioning plate for partitioning said cavity into said accumulator chamber and said coil chamber, said partitioning plate having a plurality of grooves formed in the periphery thereof, said accumulator type of injection nozzle further comprising a plurality of pins each of which is fitted into a corresponding casing body and cover member hole and a corresponding partitioning plate groove for preventing said casing body, said cover member and said partitioning plate from rotating relative to each other.

* * * * *